(12) United States Patent
Varale

(10) Patent No.: US 10,707,658 B2
(45) Date of Patent: Jul. 7, 2020

(54) STACKABLE SADDLE OF THE PERFECTED TYPE FOR SUPPORTING ELONGATED BODIES

(71) Applicant: Fi.Mo.Tec. S.p.A., Milan (IT)

(72) Inventor: Alberto Varale, Cologno Monzese (IT)

(*) Notice: Subject to any disclaimer, the term of this patent is extended or adjusted under 35 U.S.C. 154(b) by 0 days.

(21) Appl. No.: 16/099,295

(22) PCT Filed: May 15, 2017

(86) PCT No.: PCT/IB2017/000594
§ 371 (c)(1),
(2) Date: Nov. 6, 2018

(87) PCT Pub. No.: WO2017/199083
PCT Pub. Date: Nov. 23, 2017

(65) Prior Publication Data
US 2019/0214803 A1    Jul. 11, 2019

(30) Foreign Application Priority Data

May 19, 2016 (IT) .................. 102016000051437
May 11, 2017 (IT) .................. 102017000051081

(51) Int. Cl.
| | |
|---|---|
| *F16L 11/00* | (2006.01) |
| *H02G 3/04* | (2006.01) |
| *H02G 3/34* | (2006.01) |
| *F16L 3/13* | (2006.01) |
| *F16L 3/22* | (2006.01) |

(52) U.S. Cl.
CPC ............. *H02G 3/0456* (2013.01); *F16L 3/13* (2013.01); *F16L 3/222* (2013.01); *H02G 3/0406* (2013.01); *H02G 3/34* (2013.01)

(58) Field of Classification Search
CPC ... F16L 3/222; F16L 3/22; F16L 3/237; F16L 3/105; F16L 3/1091
See application file for complete search history.

(56) References Cited

U.S. PATENT DOCUMENTS

| | | | |
|---|---|---|---|
| 4,244,542 A * | 1/1981 | Mathews | F16L 3/222 138/112 |
| 4,306,697 A | 12/1981 | Mathews | |
| 4,618,114 A * | 10/1986 | McFarland | F16L 3/13 248/220.21 |
| D447,931 S * | 9/2001 | Aitken | D8/354 |

(Continued)

FOREIGN PATENT DOCUMENTS

| | | |
|---|---|---|
| DE | 102011120936 | 6/2013 |
| EP | 2045475 | 4/2009 |

(Continued)

*Primary Examiner* — Amy J. Sterling
(74) *Attorney, Agent, or Firm* — Themis Law

(57) ABSTRACT

A saddle for supporting elongated bodies has a body with a quadrangular section, on the opposite sides of which wedge-inserted coupling members are provided, to couple the saddle with another saddle, so as to have the reciprocal stacking of these saddles on a support. A saddle according to the invention offers the advantage over known saddles of being stacked on previously installed saddles due to the presence of incorporated members which allow their connection, without resorting to the use of tools or similar auxiliary equipment.

9 Claims, 8 Drawing Sheets

(56) References Cited

U.S. PATENT DOCUMENTS

| | | | |
|---|---|---|---|
| 7,942,370 B2* | 5/2011 | Hillgren | G05D 1/0615 244/175 |
| 8,020,259 B2* | 9/2011 | Ho | F16L 3/222 24/129 R |
| 2018/0266588 A1* | 9/2018 | Netke | F16L 55/035 |

FOREIGN PATENT DOCUMENTS

| | | |
|---|---|---|
| GB | 544618 | 4/1942 |
| WO | 2010005367 | 1/2010 |

* cited by examiner

STACKABLE SADDLE OF THE PERFECTED TYPE FOR SUPPORTING ELONGATED BODIES

The present invention relates to a stackable saddle of the perfected type for supporting elongated bodies.

The field of invention relates to cable-clamp systems used for sustaining elongated bodies in general, such as electric cables, coaxial cables, optical fiber cables and the like, in installations, for example in the field of telecommunications.

Current cable clamps consist of two half-saddles, reciprocally coupled to form respective housing seats for the cables to be sustained.

The joining of the two half-saddles is obtained by means of threaded bars which pass through the half-saddles in correspondence with a respective hole, or by means of jumpers inside which the saddles are connected.

In this type of known embodiment, if further saddles are to be added to those already previously installed on the cable clamp, a threaded bar must be provided which is sufficiently long to cover the whole length also of the saddles to be added. If, on the other hand, the fixing is effected by means of jumpers, these must be completely substituted by others having a greater length.

In both cases, the cable clamp must in any case be disassembled, in order to allow the saddles already assembled to be integrated with those forming the new configuration with a greater length.

The main objective of the present invention is to provide a new perfected saddle for supporting elongated bodies, which, with respect to the saddles of the known art, can be stacked on saddles already operating, without having to disassemble the cable clamp and without the use of auxiliary equipment.

Another objective of the invention is to provide a saddle for supporting elongated bodies which, unlike the known saddles, does not require the structure of half-shells reciprocally coupled to form the housing seat of the cable.

A further objective of the invention is to make the saddle compatible with different types of cables.

These and other objectives are achieved by means of the saddle of claim 1. The remaining claims indicate preferred embodiments of the saddle of the invention.

Compared to the known saddles, that of the present invention offers the advantage of being able to be stacked on saddles already previously installed, thanks to the presence of incorporated means which allow their connection, without the need, however, for resorting to the use of tools and similar auxiliary equipment.

The saddle of the invention also has the advantage of being a single body and not with separate elements that must be coupled to form the housing for the cable, thus creating a simpler, reliable and less expensive product.

A further advantage of the saddle of the invention lies in the presence of cable clamps that can be extracted from the body of the saddle which thus allow different types of cables to be fixed.

These and other objectives, advantages and features are evident from the following description of a preferred embodiment of the saddle of the invention, shown, for illustrative and non-limiting purposes, in the figures of the enclosed drawings. In which.

Figure 1:
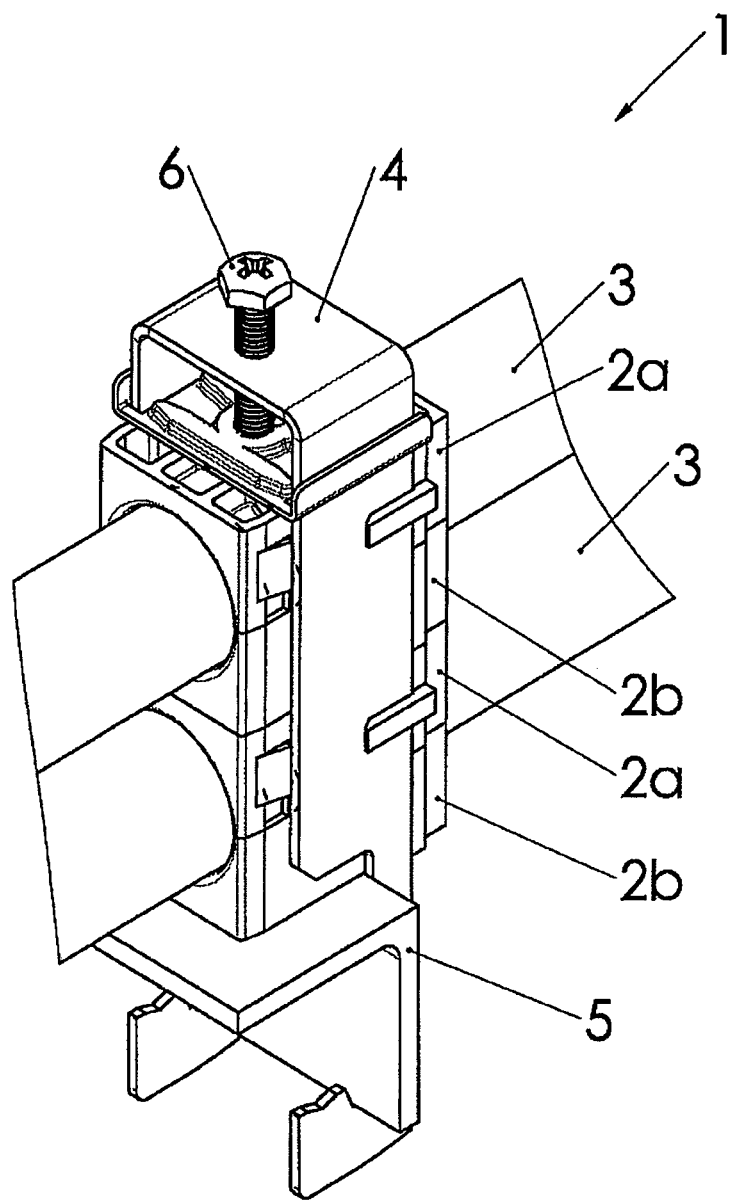
FIG. 1 illustrates a cable clamp of the known art wherein the saddles are withheld by means of a jumper.

The cable-clamp device 1 of the known art, illustrated in FIG. 1, comprises a plurality of saddles 2, each composed of a pair of half-saddles 2a, 2b which form, by joining them, the seat for sustaining the respective cable 3.

The cable clamp 1 provides a jumper 4, fixed on a respective support 5 by means of a screw 6, for sustaining the saddles 2. It is therefore evident that when additional saddles 2, with respect to those already operating, are to be assembled on the cable clamp 1 of FIG. 1, the jumper 4 must be completely substituted by another having a greater length.

Figure 2:
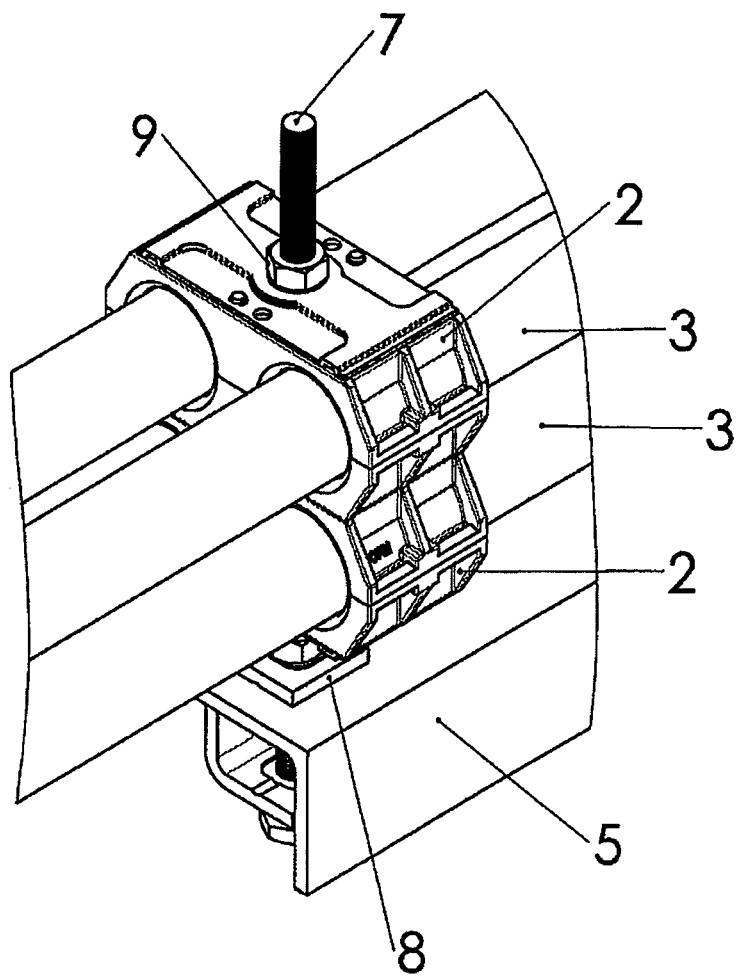
FIG. 2 illustrates another example of a cable clamp of the known art, with saddles held in position on a respective support by means of a threaded bar screwed onto a clamp.

In the embodiment illustrated in FIG. 2, also forming part of the known art, the saddles 2 are reciprocally stacked on a threaded bar 7, in turn sustained by a clamp 8 for connection with the support 5.

In this case, if a saddle 2 is to be added to those already present on the cable clamp, the nut 9 of the threaded bar 7 must be disassembled, and the length of the bar must be such as to be able to also receive the saddle or saddles added to the previous ones.

Figure 3:
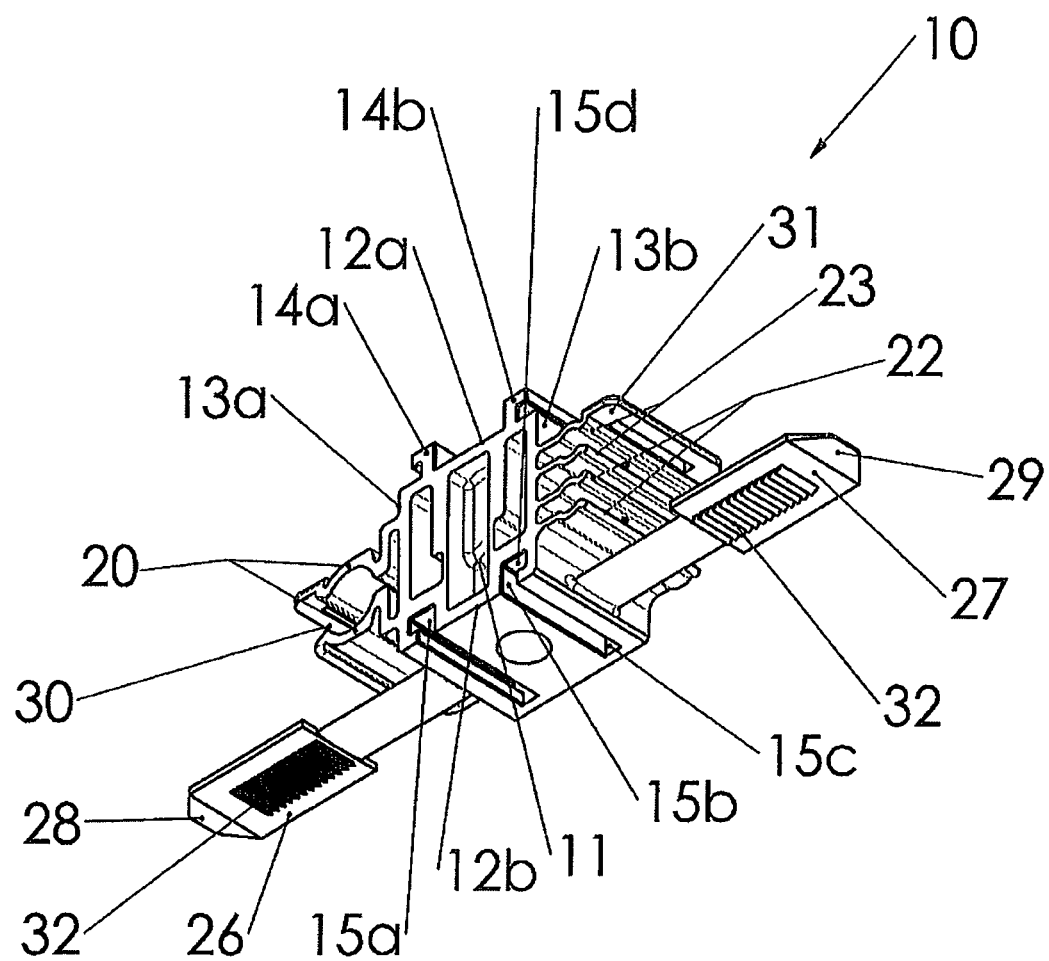
FIG. 3 illustrates a perspective view of an embodiment of the stackable saddle of the invention.
Figure 4:
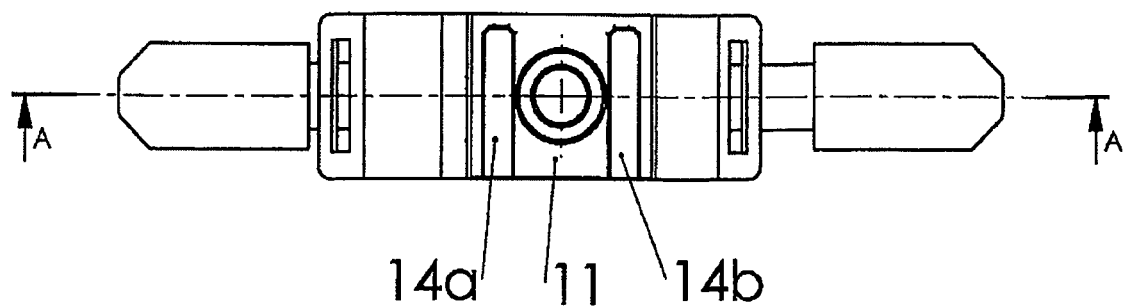
FIG. 4 illustrates a plan view the saddle of FIG. 3.

In order to overcome the drawbacks of the known art described above, the saddle of the invention, indicated as a whole with 10 in FIG. 3, substantially consists of a body having a quadrangular section 11, made of plastic material (a cube or other body having the form of a rectangular parallelepiped in general), on two opposite sides 12a and 12b of which the stacking means of the saddles are provided, whereas means for fixing the cables 3 are present on two other opposing sides 13a and 13b.

Figure 6:
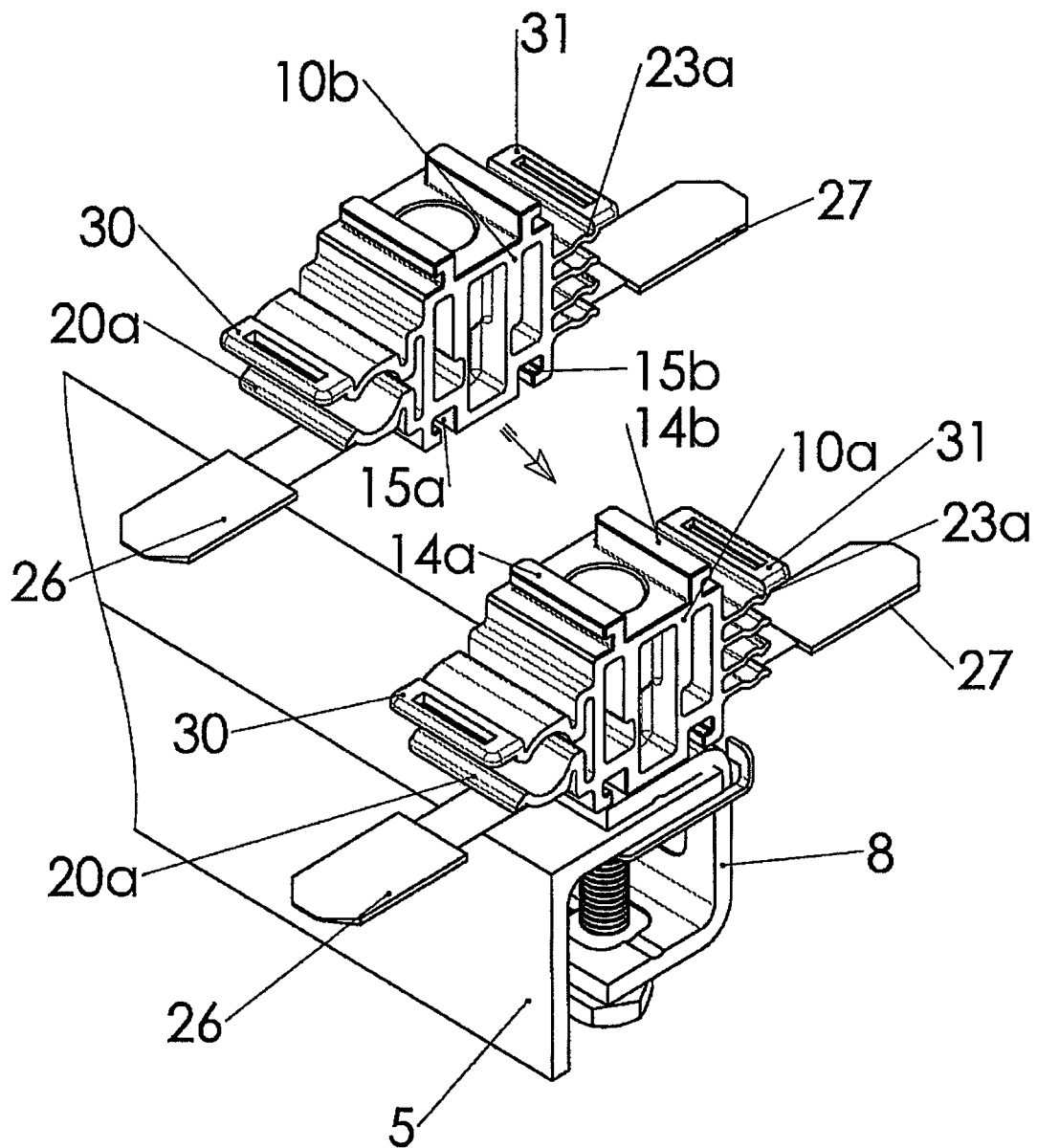
FIG. 6 illustrates the stacking phase of an additional saddle of FIG. 3 on a previously installed saddle.
Figure 7:
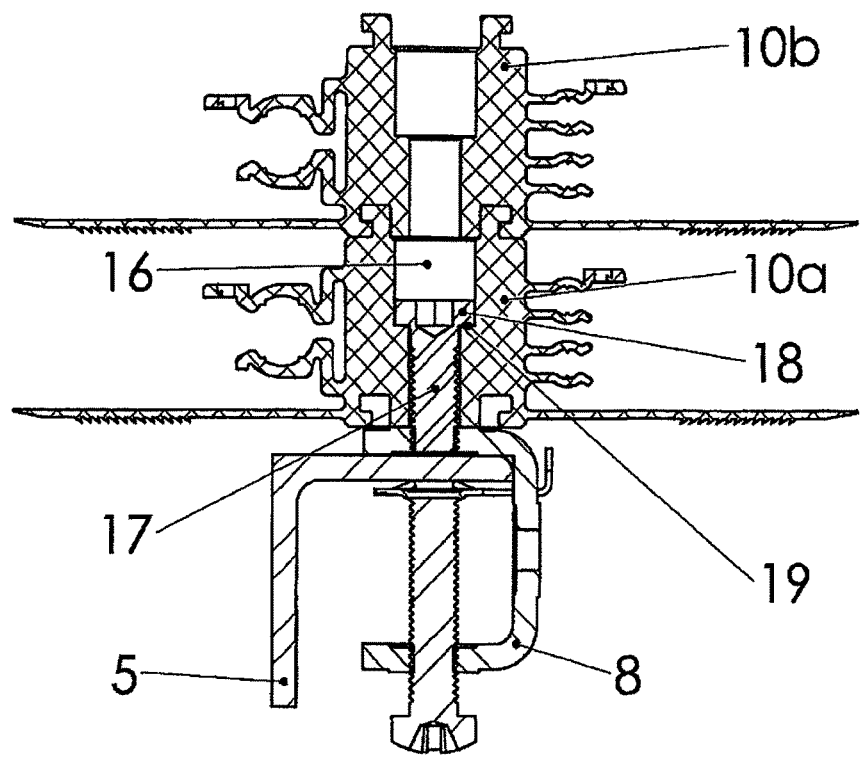
FIG. 7 illustrate a sectional view of a cable clamp with a plurality of saddles stacked according to the invention.
Figure 8:
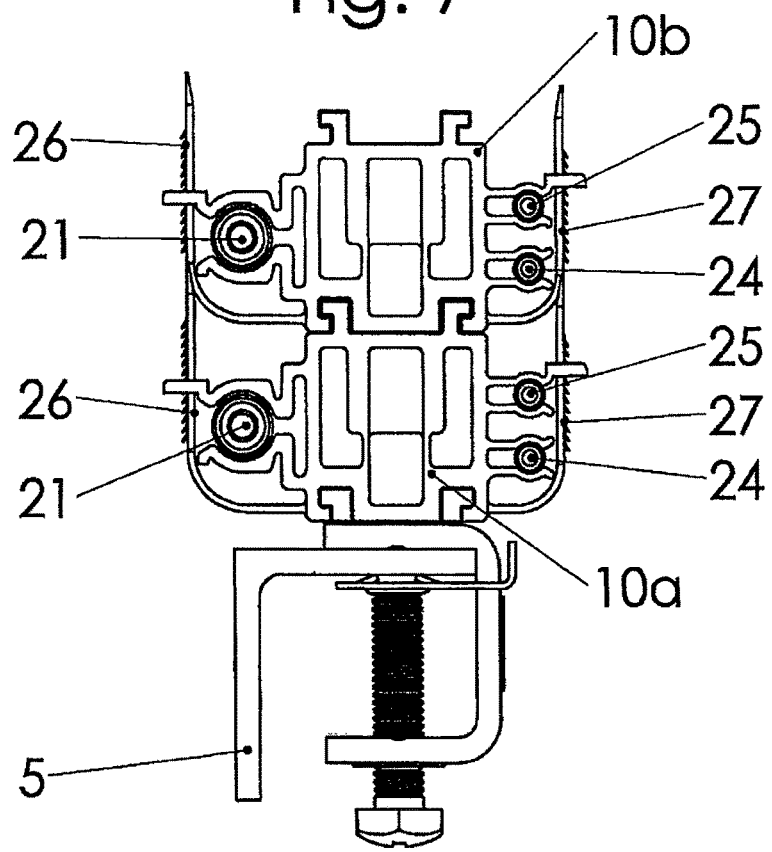
FIG. 8 illustrates the cable clamp of FIG. 7 with the cables assembled in operation.

In particular, the above-mentioned stacking means provided on the side 12a of the body 11 consist of slides 14a, 14b having, for example, a substantially "L"-shaped section, whose size and arrangement are such as to be wedge-inserted inside corresponding seats 15a, 15b provided on the side 12b of the body 11 of the contiguous saddle 10 and closed in correspondence with their side 15c opposite to that 15d for the insertion of the slides 14a, 14b (FIGS. 6-8).

Figure 5:
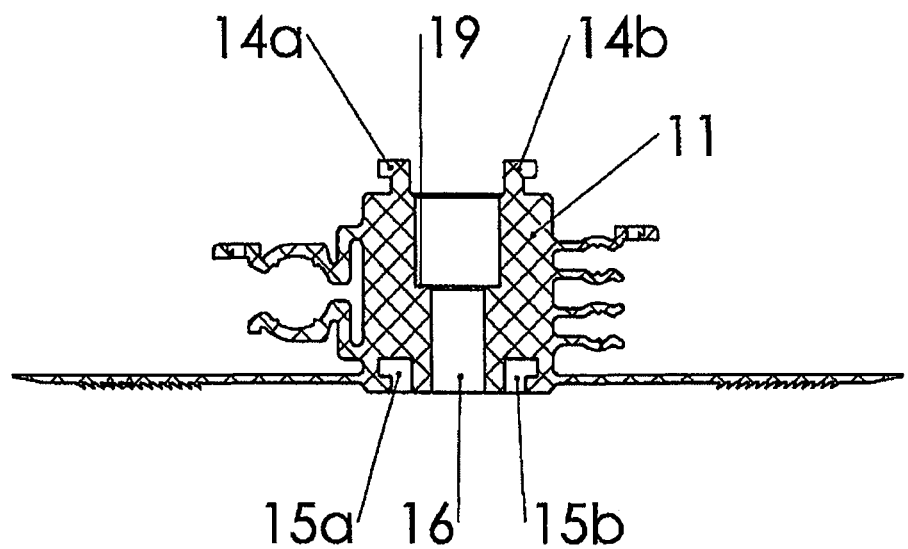
FIG. 5 illustrates the saddle of FIG. 4 in a section A-A.

As can be seen from the section of FIGS. 5 and 7, the body 11 is longitudinally crossed by a hole 16 for housing a screw 17, whose head 18 rests on the abutment 19 of the hole 16 to effect the anchoring of the first saddle 10a of FIG. 7 on the clamp 8, in turn tightened on the respective support 5.

In this embodiment, the stacking of a new saddle 10b on that 10a already installed on the cable clamp, is effected by the wedge-insertion of the slides 14a, 14b of the saddle 10a, inside the seats 15a, 15b of the saddle 10b immediately following (FIGS. 6-8).

As better illustrated in FIGS. 3 and 8, the saddle 10 of the invention has, on the side 13a, elastically deformable arms 20, suitable for being elastically tightened around a first cable 21. On the opposite side 13b of the saddle 10, analogous arms 22, 23 are also provided for sustaining respective cables 24 and 25.

It should be understood that the invention is not limited to the embodiment illustrated in these figures, as the saddle 10 can have a different number of arms 20, 22, 23 for forming corresponding seats for as many different cables.

Furthermore, in order to prevent the cables 21, 24 and 25 from becoming detached from the respective arms 20, 22 and 23, the saddle 10 of the invention comprises a flexible flap 26 on the side 13a and an analogous flap 27 on the side 13b of the above-mentioned body 11. The flaps 26 and 27 are fixed at one end, to the respective side 13a, 13b of the body 11, whereas the opposite end 28, 29 is suitable for being engaged on the respective withholding means 30, 31. In particular, the above-mentioned withholding means 30 are positioned on the arm 20a of the saddles of FIG. 6, whereas the withholding means 31 are positioned on the arm 23a of the same saddles of FIG. 6. In this way, the closing of the cables 21, 24, 25 is obtained inside the respective arms 20, 22, 23 by the connection of the flaps 26, 27 on the respective withholding means 30 and 31.

The end 28, 29 of the flaps 26, 27 is advantageously provided with a toothing 32, whose function is to ensure the grip with the withholding means 30 and 31, also in the presence of cables having a different diameter.

In the variant of FIGS. 9 to 12, the saddle of the invention has a modular structure, in which extractable cable clampers 47 and 48 are blocked on the quadrangular body 11. In particular, grooves 33 and 34 are formed on the body 11 of the saddle of the invention, inside which corresponding cursors 35 and 36 are engaged, by inserted sliding, which are "T" shaped in the example illustrated. These cursors are, in turn, fixed to respective bases 37 and 38, in turned equipped with corresponding deformable arms 39 and 40, substantially analogous to the arms 20, 22 and 23 of FIG. 3.

Thanks to the modular structure of the saddle of the invention with extractable cable clampers 47 and 48, different cable clampers can be assembled on the same body 11, compatible with equivalent different types of cable, in form, dimensions, weight and so forth.

In the variant of FIGS. 9 to 12 the saddle of the invention provides, in place of the flaps 26, 27 illustrated in FIGS. 3 to 8, corresponding caps 41, fixed, at one side, to the end of one of the deformable arms 39 and 40, the other side, however, being left free, so that it can be snap-closed on the cable housed inside the respective cable clamp 47, 48.

Figure 9:
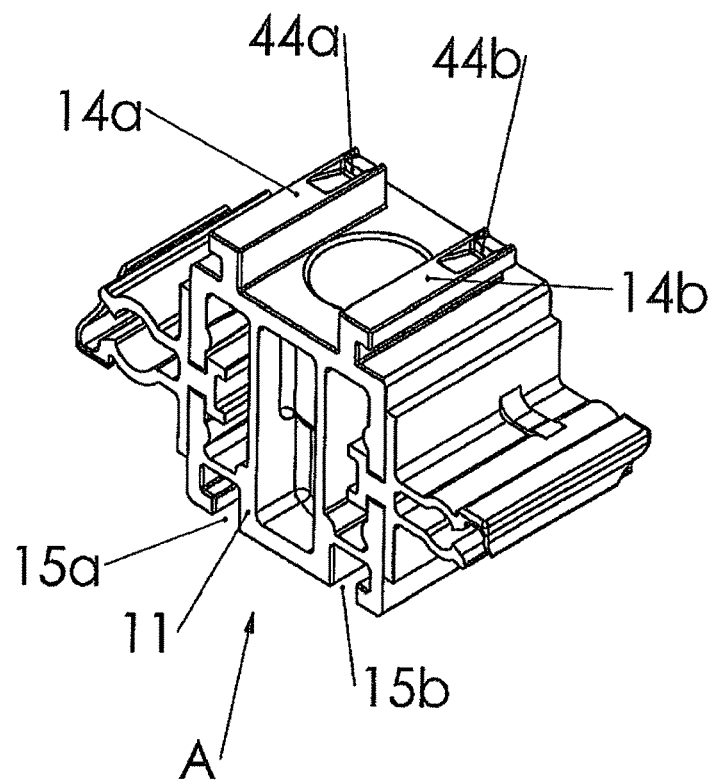
FIG. 9 illustrates an embodiment variant of the saddle of the invention with a system of extractable cable clamps.
Figure 10:
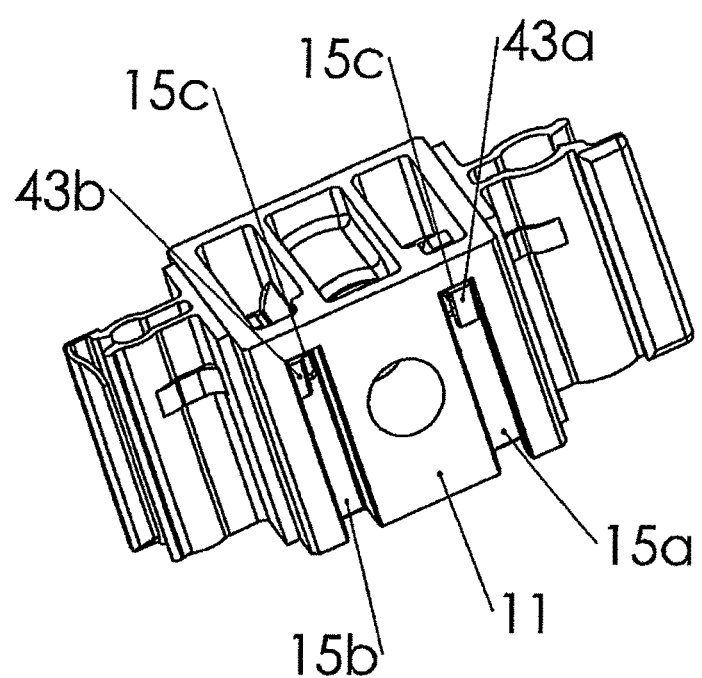
FIG. 10 illustrates the saddle of FIG. 9 with a view from A.
Figure 11:
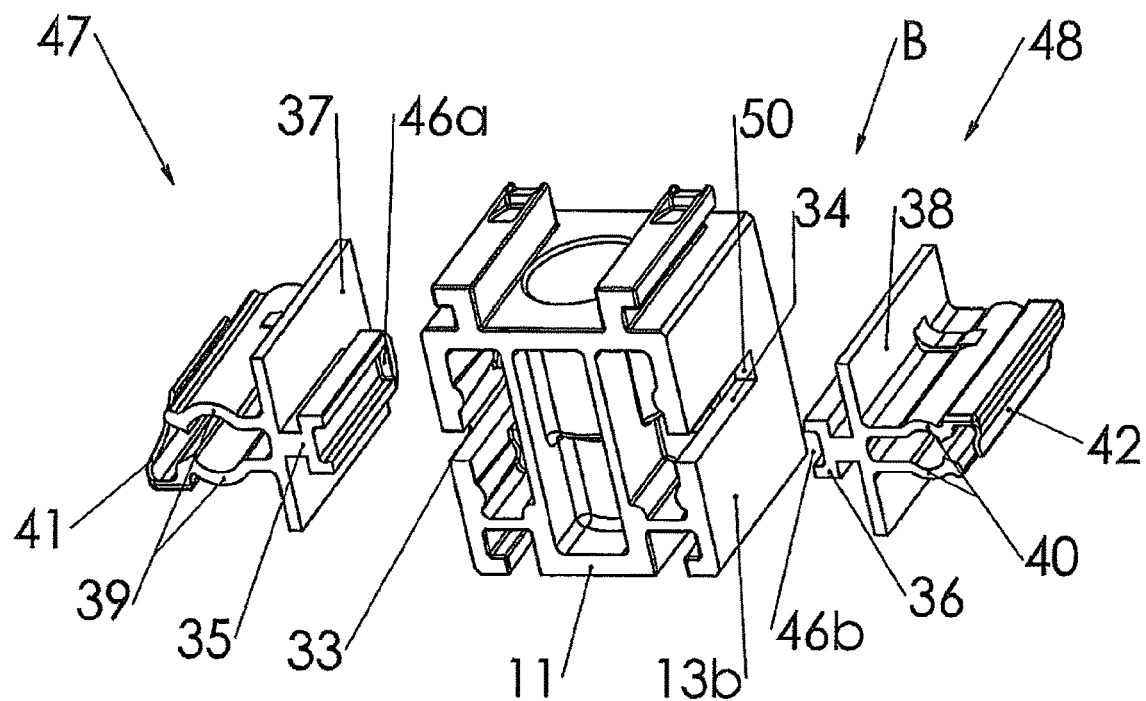
FIG. 11 illustrates an exploded view of the saddle of FIG. 9.
Figure 12:
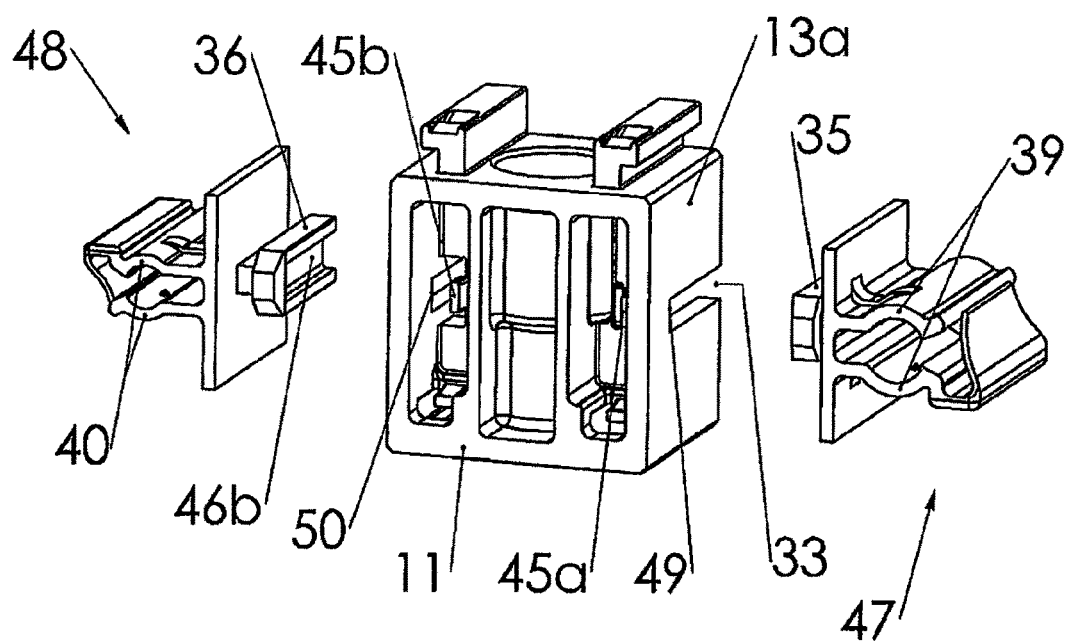
FIG. 12 illustrates the saddle of FIG. 11 with a view from B.

As better illustrated in FIGS. 9 and 10, elastic flaps 43a, 43b are advantageously provided inside the seats 15a, 15b, for the slides 14a and 14b, whose function is to cooperate with respective housings 44a, 44b provided on the same slides 14a, 14b. The reciprocal blocking between stacked saddles 10a, 10b is thus effected bidirectionally, thanks to the contribution of the system described of flaps 43a, 43b and housings 44a, 44b with the above-mentioned closing on the side 15c of said seats 15a, 15b.

An analogous system with elastic flaps 45a, 45b positioned inside the body 11 of the saddle of the invention, and with housings 46a, 46b provided on the cursors 35, 36 is used for, blocking the same cursors 35, 36 of the extractable cable clamps 47, 48 inside the respective grooves 33, 34 of the body 11 of the saddle 10, in which said grooves are closed at their ends 49, 50.

The invention claimed is:

1. A saddle for supporting elongated bodies, comprising:
   a body having a quadrangular section, said body having a hole extending from an upper side of said body to a lower side of said body, said hole being configured to receive a screw and having an inner abutment configured to support a head of said screw;
   wedge-inserted coupling members provided on the lower side of said body and coupling seats provided on the upper side of said body, so as to couple the saddle with a second saddle and have a reciprocal stacking of the saddle with the second saddle on a respective support, wherein said wedge-inserted coupling members consist of slides shaped to engage the seats; and
   deformable arms extending outwardly from opposing lateral sides of the body, said deformable arms being configured to retain elongated bodies.

2. The saddle according to claim 1, wherein the saddle has a modular structure, and wherein the deformable arms are removably coupled from said opposing lateral sides.

3. The saddle according to claim 2, wherein said deformable arms are attached to a base having cursors extending therefrom.

4. The saddle according to claim 3, further comprising grooves defined on the opposing lateral sides of said body and configured to slidingly receive said cursors.

5. The saddle according to claim 4, further comprising elastic flaps positioned inside said seats and adapted to cooperate with respective housings positioned on said slides for fixedly engaging the saddle to the second saddle when stacked.

6. The saddle according to claim 4, further comprising elastic flaps positioned inside said body and adapted to cooperate with respective housings formed on said cursors for fixedly engaging the cursors in the grooves.

7. The saddle according to claim 1, wherein said body has a first flexible flap, said flexible flap being fixed, at one of its ends, to said side and a second flexible flap fixed, at one of its ends, to said side, opposite ends of said first and said second flaps being engaged with corresponding withholding members respectively provided on said deformable arms.

8. The saddle according to claim 7, wherein said ends of the first and the second flexible flaps are provided with a toothing.

9. A cable clamp device provided with at least one saddle according to claim 1, comprising:
   a saddle having a body of a quadrangular section, said body having a hole extending from an upper side of said body to a lower side of said body, said hole being configured to receive a screw and having an inner abutment configured to support a head of said screw;
   wedge-inserted coupling members provided the lower side of said body and coupling seats provided on the upper side of said body, so as to couple the saddle with a second saddle and have a reciprocal stacking of the saddle with the second saddle on a respective support, wherein said wedge-inserted coupling members consist of slides shaped to engage the seats; and
   deformable arms extending outwardly from opposing lateral sides of the body, said deformable arms being configured to retain elongated bodies; and
   a clamp fixed to said screw and adapted to anchor the cable clamp to said respective support.

* * * * *